Patented Nov. 10, 1942

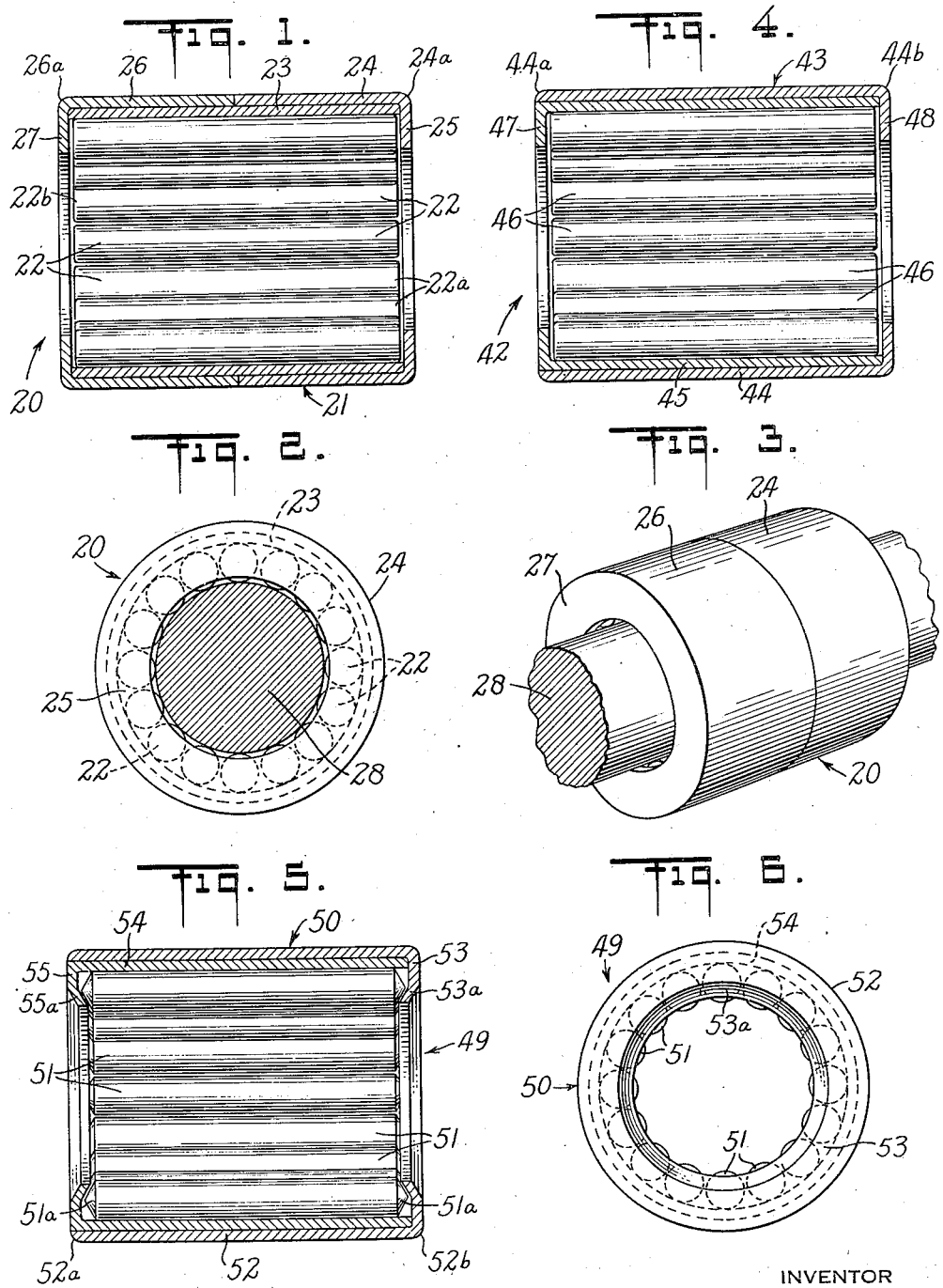

2,301,399

UNITED STATES PATENT OFFICE 2,301,399

ROLLER BEARING

Lewis R. Heim, Fairfield Beach, Conn.

Original application July 18, 1934, Serial No. 735,802. Divided and this application November 19, 1937, Serial No. 175,389

12 Claims. (Cl. 308—212)

This invention relates to a roller bearing construction.

One of the objects of this invention is to provide a roller bearing which is light and simple in construction, yet durable and sturdy in use. Another object is to provide a device of the above nature capable of bearing loads heavy in proportion to its size. Another object is to provide a device of the above nature which can be rapidly manufactured in large quantities by unskilled labor without loss of uniformity in size. Another object is to provide a device of the above character, the various parts of which can be formed from inexpensive materials and readily assembled with a minimum expenditure of time and labor. Another object is to provide a device of the above character in which machining operations are reduced to a minimum. Another object is to provide a device of the above character capable of carrying a maximum number of rolls or the like. Other objects will be in part obvious and in part pointed out hereinafter.

This application is a division of my application Serial No. 735,802, filed July 18, 1934, now matured into Patent No. 2,102,460, issued December 14, 1937.

The invention accordingly consists in the features of construction, combinations of elements, and arrangements of parts as will be exemplified in the structure to be hereinafter described and the scope of the application of which will be indicated in the following claims.

In the accompanying drawing, in which is shown one or more of the various possible embodiments of the mechanical features of my invention, Figure 1 is a sectional elevation of a bearing;

Figure 2 is an end elevation of the bearing shown in Figure 1, mounted on a shaft;

Figure 3 is a perspective view of the bearing shown in Figure 1 mounted on a shaft;

Figure 4 is a sectional elevation of a modified form of my bearing;

Figure 5 is a sectional elevation of another embodiment of certain features of my bearing; and, Figure 6 is an end view of the bearing shown in Figure 5.

Similar reference characters refer to similar parts throughout the several views of the drawing.

As conducive to a clearer understanding of certain features of this invention, it might here be pointed out that the manufacture of anti-friction devices of the above nature are characterized by various conditions not amenable to a high production of bearings of uniform size. Such bearings depend for their uniformity upon various machining operations whereby the various diameters of the different parts of the bearing must be obtained by machining or grinding operations, for example, to achieve the desired size. These methods are not only slow and expensive but are productive of errors with the result that the bearings do not have the necessary uniformity important in devices of this nature. In addition, it is necessary to employ skilled labor to practice this manufacture and accordingly another large item of expense is added. Further difficulties are encountered due to the fact that the rolls or balls, as the case may be, readily fall out of operative position while being installed or shipped, for example, thus causing considerable inconvenience and time-consuming labor in reassembling the bearing. These bearings further have a small roll capacity in relation to the roll race and accordingly their ability to withstand heavy loads in proportion to their size is considerably limited. One of the objects of this invention is to provide a device in which the above difficulties, in addition to many others, are rectified.

Referring now to Figure 1, in which one embodiment of my bearing construction is generally indicated at 20, a race generally indicated at 21 has disposed therein a plurality of rolls 22 or the like. Rolls 22 are disposed about the inner periphery of a cylindrical shell 23, this shell being preferably stamped or formed from sheet metal or the like and, under certain conditions, hardened by suitable heat treatment, all as will be more clearly described hereinafter. Shell 23 preferably slightly exceeds rolls 22 in length.

Preferably I provide a sleeve-like member 24 related to shell 23 preferably by a force or driven fit, thus obviating the necessity of a separate part to retain shell 23 and sleeve 24 in related assembly and, by the same token, expediting the production and assembly of the bearing. Edges 26a and 24b of shells 26 and 24 are preferably slightly rounded or beveled to facilitate the insertion of bearing 20 into a bore provided for its reception. A flange-like projection 25 is preferably integral with sleeve 24 and extends therefrom radially toward the axis of bearing 20 a suitable distance to substantially cover the adjacent ends 22a of rolls 22 as more clearly shown in Figure 2. A second sleeve member 26 substantially similar to sleeve 24 and having a flange 27 is related to shell 23 preferably by a force or driven fit. Thus flange 27 substantially covers the adjacent ends 22b of rolls 22. Preferably the inner diameter of shell 23 and the diameters of rolls 22 are so proportioned that rolls 22 mutually sustain one another against radial displacement. In other words, each of rolls 22 acts as a keystone, and this feature, together with limitation against axial displacement provided by flanges 25 and 27, renders the rolls immune from any sort of displacement, thus greatly expediting shipping and installation and saving the inconvenience, time and labor of reassembling the bearing as would be the case otherwise. This construction further obviates the necessity of providing a cage or similar retaining device. Furthermore, the peculiar keystone or overlapping relation of the rolls 22 results in efficient and highly beneficial self-alignment, as the rolls are in such close proximity that variation from their proper axes of rotation is precluded and accordingly the risk of jamming is reduced to a minimum.

As more clearly shown in Figures 2 and 3, the inner periphery of flange 27 is but slightly spaced from a shaft 28 borne by bearing 20. Thus the aperture between flange 27 and shaft 28 is large enough to permit the entrance of a suitable lubricant, but is so small as to prevent the admission of foreign particles that would be injurious to the smooth bearing surfaces of rolls 22 and shell 23.

As pointed out above, shell 23 is preferably formed from suitable flat stock which may be sheet steel. Likewise sleeves 24 and 26 are preferably produced from the same type or kind of sheet steel. As inexpensive manufacture and high production are among the several objects of the invention, I have found it preferable to form shell 23 and sleeves 24 and 26 in suitable automatics by suitably related dies.

Under certain circumstances I have found it preferable to provide a bearing having a race comprised of two telescopically fitting shells. Accordingly I have provided a bearing generally indicated at 42 (Figure 4), having a race generally indicated at 43 comprised of a pair of telescopically fitting shells 44 and 45 within which a number of rolls 46 are disposed. Edges 44a and 44b of shell 40 are preferably slightly rounded to facilitate the disposition of bearing 42 into a bore provided for its reception. Extending radially toward the axis of bearing 42, I preferably provide a flange 47 preferably integral with shell 45 and a flange 48 preferably integral with shell 44. Flanges 47 and 48 are preferably wide enough to substantially cover the opposite ends of rolls 46 for the same purposes as pointed out above with respect to flanges 25 and 27 of bearing 20 in Figures 1, 2 and 3. Preferably shells 44 and 45 are related by a force or driven fit, thus obviating the necessity of providing securing means to retain the shells in related assembly.

The diameters of shells 44 and 45 and those of rolls 46 are preferably so proportioned that rolls 46 may be disposed in race 43 in overlapping relationship, that is, each roll acts as a keystone to prevent radial displacement of the rolls. As flanges 47 and 48 effectively prevent axial displacement of rolls 46, the bearing, once assembled, is immune from involuntary disassembly, thus greatly facilitating shipment of the bearing and installation thereof.

As the length of rolls 46 is preferably slightly less than the distance between flanges 47 and 48, and as the rolls, due to their keystone relationship, are in close proximity to one another, jamming of the rolls with each other or with race 43 is effectively precluded as the rolls cannot wander from their proper axes of rotation with respect to the axis of rotation of the bearing. Or, in other words, the axes of rotation of bearing 42 and rolls 46 are constantly parallel.

Shells 44 and 45 of race 43 may be formed in any suitable manner from any suitable material. However, I have found it preferable to stamp shells 44 and 45 from suitable sheet metal.

Under certain conditions, I have found it preferable to employ a bearing having a different flange construction than that pointed out above. Referring to Figures 5 and 6, there is generally indicated at 49 a bearing having a race generally indicated at 50 within which are rotatably disposed a number of rolls 51 having reduced ends 51a. Race 50 is preferably comprised of a shell 52 having rounded or beveled edges 52a and 52b and a radial flange 53 extending inwardly toward the axis of bearing 49. Telescopically disposed within shell 52, and preferably related thereto by a force fit, is a shell 54 having a radial flange 55 extending inwardly toward the axis of bearing 49. Flanges 53 and 55 preferably have portions 53a and 55a respectively, which extend axially toward one another preferably at a suitable angle to register with reduced ends 51a of rolls 51. Thus where it is inconvenient to include the above-described keystone relation between the rolls, the provision of flanges 53 and 55 with their respective portions 53a and 55a serve in the double capacity of maintaining the rolls in related assembly against radial or axial displacement. It will also be seen that flanges 53 and 55 serve as a lubricant retainer and a guard against the admission of injurious foreign particles as pointed out above with respect to flanges 25 and 27 of bearing 20 in Figure 1.

While the several bearings described hereinabove may be assembled in any suitable manner, I have found it preferable and convenient in the case of bearing 20 (Figure 1) to force sleeve 24 over shell 23 by an arborpress, for example, and thereafter insert into shell 23 a full quota of rolls 22. As rolls 22 lie in overlapping relation, their displacement could only occur in any axial direction away from flange 25. As the parts so far assembled are now seated in the press with flange 25 on the bottom, such displacement will not occur, and sleeve 26 may be readily forced into place over shell 23, thus completing the assembly of the bearing.

As the assembly of bearing 42 is substantially similar to that of bearing 49, only the assembly of bearing 42 will be described. Preferably shell 45 is placed on the table of a suitable arbor press or the like with flange 47 downward. A full quota of rolls 46 is then installed in shell 45 wherein they will sustain one another against radial displacement due to the above-mentioned keystone relation. Thereupon shell 44 is forced down about shell 45 until it is in completely assembled relation therewith.

Under certain conditions, as, for example, where the bearing will be subjected to very heavy loads and extensive use, I have found it preferable to heat treat the sheet metal parts by a suitable tempering or case hardening process as desired. Upon being subjected to the high temperature inherent in such processes, I have found that occasionally the sheet metal parts will warp slightly. This condition, however, is rectified in the assembly of the parts as any warping will be ironed out when one such part is pressed over another, and accordingly a very round and rigid bearing results.

Thus it will be seen that I have provided a bearing having a maximum roll capacity and accordingly an extremely high load capacity and long life in proportion to its size. Furthermore the manufacture of my bearing may be carried out on a high production basis characterized by minimum expense per unit due to absence of machining operations such as grinding or burning.

Accordingly I have provided a construction of an essentially practical nature in which the several objects of this invention are attained.

As many possible embodiments may be made of the above invention and as many changes might be made in the embodiment above set forth, it is to be understood that all matter hereinbefore set forth, or shown in the accompanying drawing is to be interpreted as illustrative and not in a limiting sense.

I claim:

1. In roller bearing construction, in combination, a race, a plurality of rolls in said race, the length of said rolls being no greater than the length of said race, said rolls being so related to said race that each acts as a keystone for the others to prevent radial displacement, a pair of sleeve members mounted about said race, and flange means associated with said sleeve members and adapted to register with the ends of said rolls to maintain said rolls against axial displacement.

2. In roller bearing construction, in combination, a race, roller means in said race, and means including flanged members force-fitted on said race, the flanges on said members registering with said roller means to sustain said roller means against axial displacement.

3. In roller bearing construction, in combination, a cylindrical roll race, a plurality of rolls distributed about said race whereby each roll functions as a keystone for the other rolls to maintain said rolls against radial displacement, said rolls being of no greater length than said race, a pair of sleeve members force-fitted over opposite ends of said race, said sleeve members and race being heat treated, whereby the pressure exerted on said sleeve members by the force-fitting thereof corrects any out-of-roundness therein, and flange means associated with said sleeve members and extending radially therefrom toward the axis of said members, said means being adapted to register with the ends of said rolls to retain said rolls against axial displacement.

4. In roller bearing construction, in combination, a metallic cylindrical race member adapted to receive a plurality of anti-friction devices, a plurality of anti-friction members distributed about the inner periphery of said race member, the axis of any one of said anti-friction members being no greater than the axis of said race member, metallic sleeve means force-fitted over said race member, whereby the pressure resulting from the force-fitting of said race member and said sleeve means corrects any out-of-roundness therein, the axis of said sleeve means being no less than the axis of said race member, and flange means associated with said sleeve means, said flange means being adapted to register with portions of said anti-friction members to retain said anti-friction members against displacement from their operative position in said race member.

5. In roller bearing construction, in combination, a race, flange means associated with said race and extending radially thereof, and a plurality of rolls distributed about the inner periphery of said race whereby each roll acts as a keystone for the others to maintain said rolls in operate position and sustain said rolls against radial displacement, said flange means being adapted to retain said rolls against axial displacement.

6. In roller bearing construction, in combination, a flanged sleeve member, a flanged sleeve member force fitted over said first-mentioned member to form a race, the force-fitting of said sleeve members being adapted to correct any out-of-roundness therein, and a plurality of rolls disposed within said race between the flanges of said members whereby said rolls are retained against axial displacement.

7. In roller bearing construction, in combination, a race including at least two thicknesses of metal in the form of telescopically force-fitted shells, whereby the pressure resulting from the force-fitting of said shells corrects any out-of-roundness therein, means forming a flange on each end of said race, and a plurality of rolls distributed about the inner periphery of said race, said rolls being dimensioned with respect to said inner periphery so that each roll acts as a keystone for the others to maintain the rolls in operative position and sustain them against radial displacement.

8. In a roller bearing construction, in combination, a race, anti-friction means in said race, sleeve means fitted about said race, the outer diameter of said race being slightly larger than the inner diameter of said sleeve means, whereby when said sleeve means and said race are assembled, the difference in the said diameters prevents separation thereof, and flange means on said sleeve means for maintaining said anti-friction means against axial displacement in at least one direction.

9. A roller bearing adapted to be inserted into a bore or the like, said bearing comprising, in combination, a sheet metal roll race of uniform thickness having a continuous unbroken tracking surface, an inwardly bent in flange integral with said race at each end thereof, the thickness of each of said flanges being less than that of said race, and a plurality of rolls disposed about said race in tracking engagement therewith, said rolls being shorter than said race and so proportioned with respect to said race that each roll acts as a keystone for the others to preclude displacement thereof radially of said race.

10. A roller bearing construction in accordance with claim 8 wherein the anti-friction means comprise a quota of rolls having tapered ends, and the flange means on the sleeve means are bent inwardly axially of the sleeve means to engage under the tapered ends of the rolls to sustain the rolls against radial collapse from their operative tracking position in the race.

11. In roller bearing construction in accordance with claim 8, wherein the race and the sleeve means are of substantially equal length, flange means on said race for cooperating with the flange means on the sleeve means to maintain said anti-friction means against axial displacement in either direction, said anti-friction means comprising a quota of rollers having reduced ends, both of said flange means being bent toward one another axially of the bearing to engage under the reduced ends of the rollers to maintain them against radial collapse.

12. A roller bearing construction in accordance with claim 6, wherein the rolls have reduced ends and the flanges on the sleeve members are bent toward one another to engage under the reduced ends of the rolls to support the rolls against radial collapse.

LEWIS R. HEIM.